UNITED STATES PATENT OFFICE.

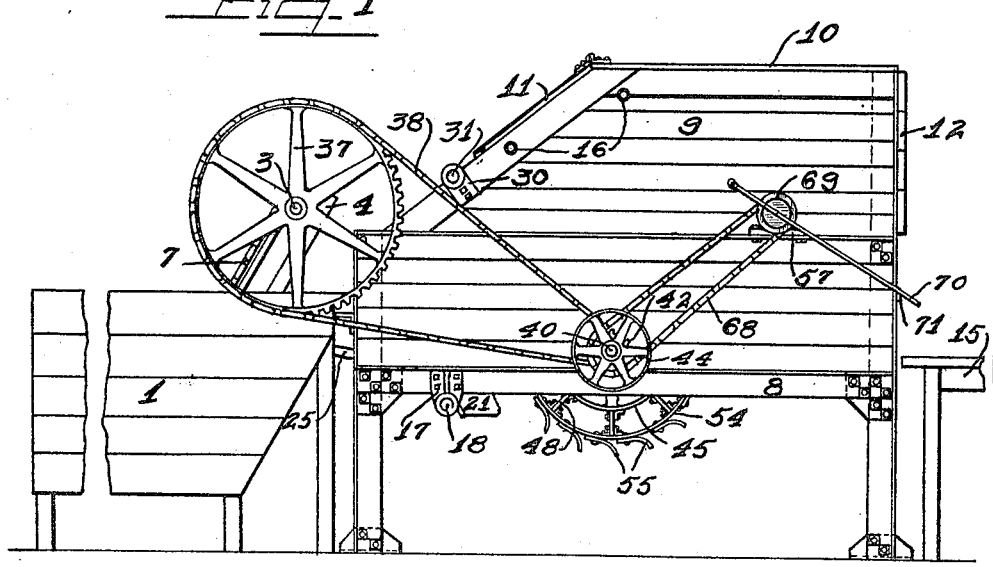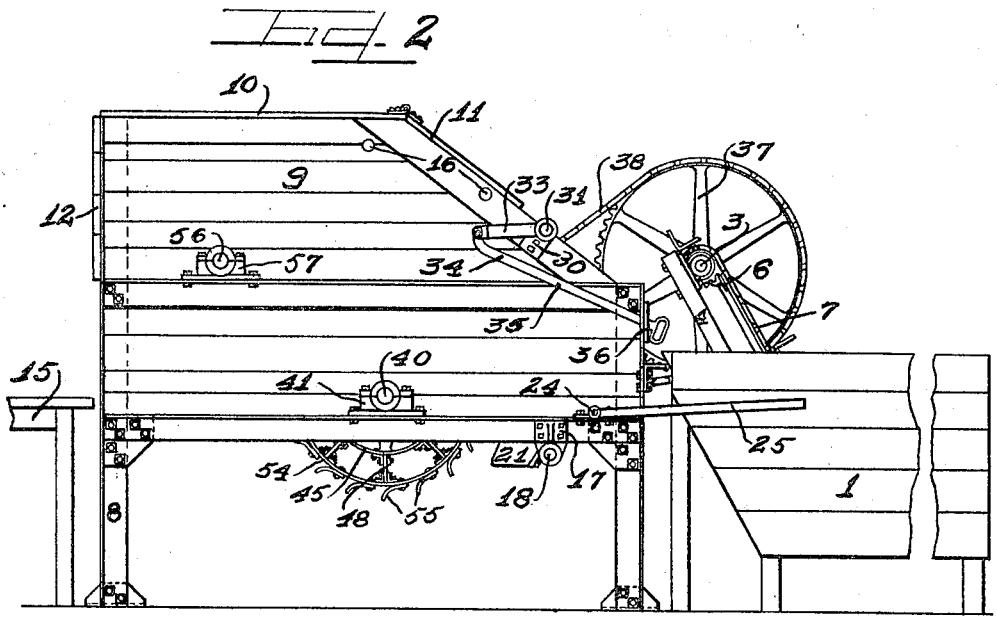

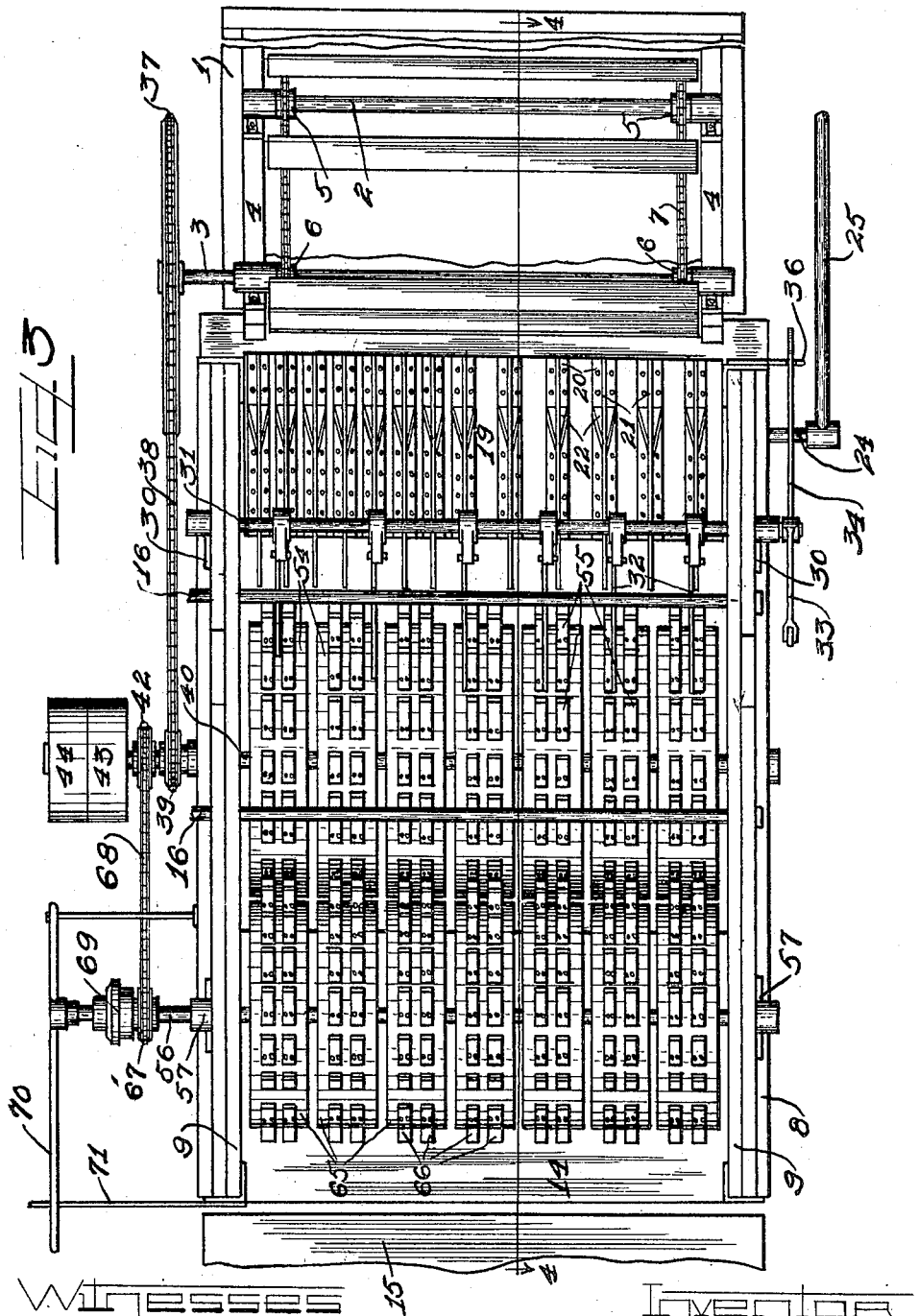

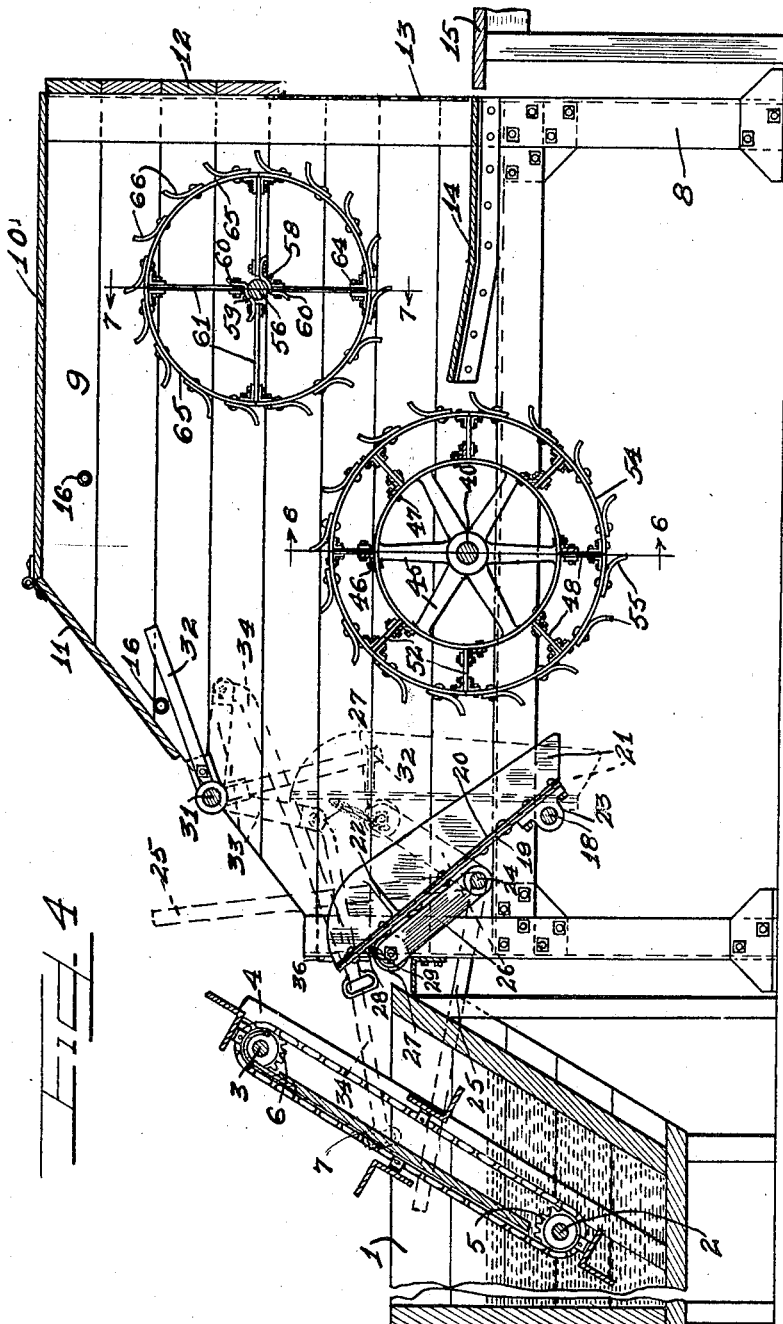

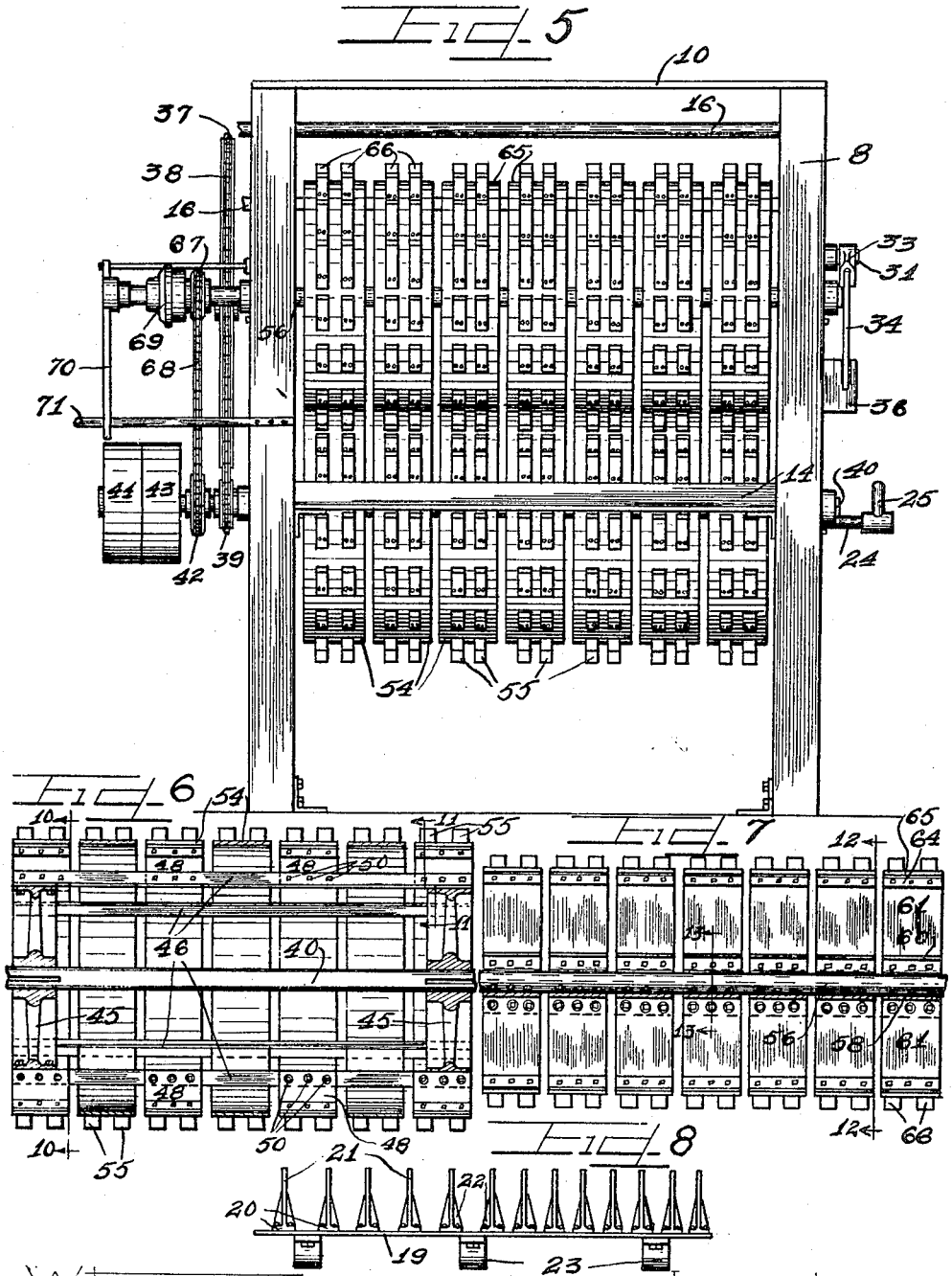

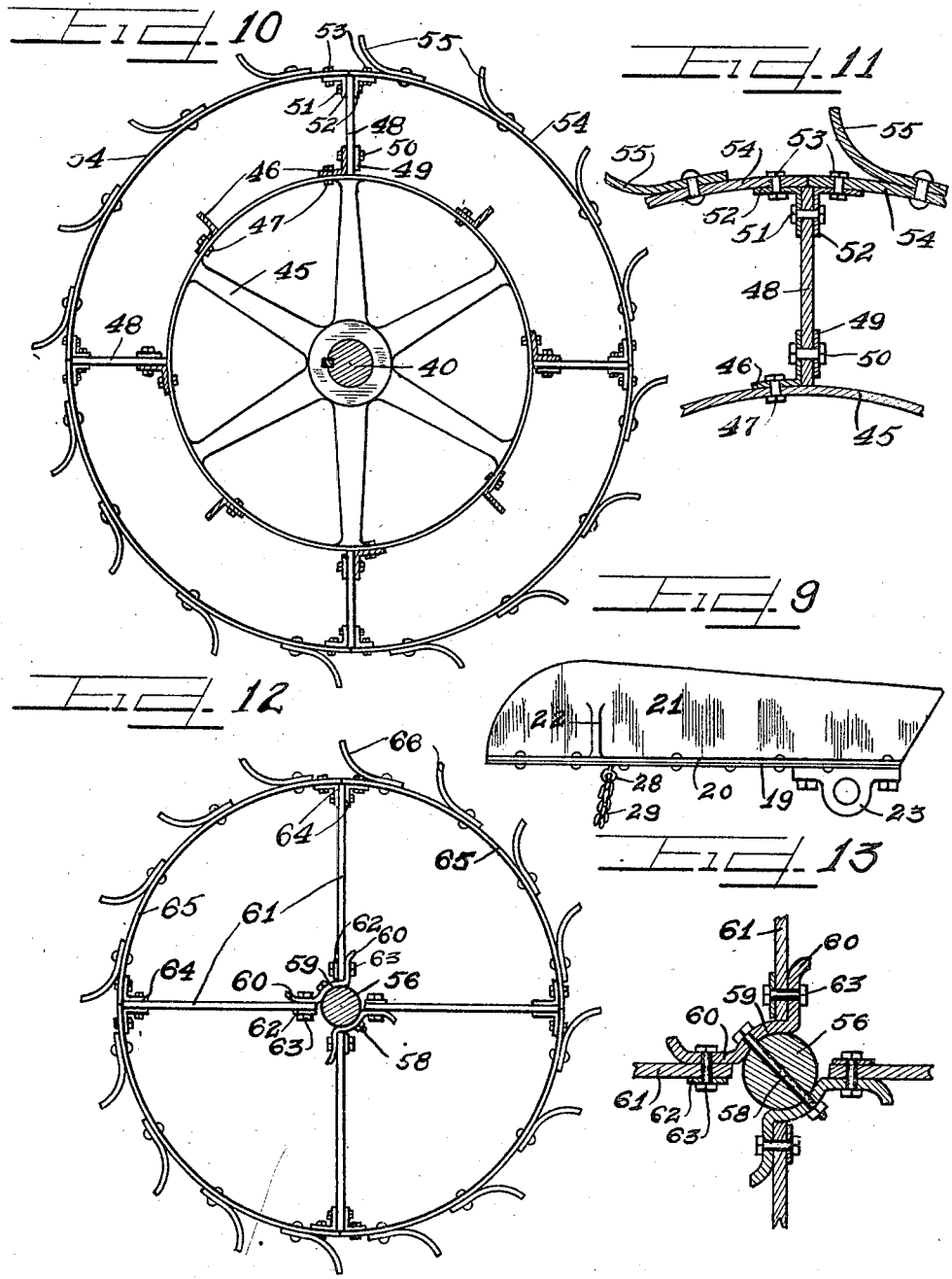

JOHN W. KOHLHEPP, OF CHICAGO, ILLINOIS, ASSIGNOR TO THE ALLBRIGHT-NELL COMPANY, OF CHICAGO, ILLINOIS, A CORPORATION OF ILLINOIS.

MULTIPLE-DRUM CARCASS-DEHAIRING MACHINE.

1,323,637.  Specification of Letters Patent.  Patented Dec. 2, 1919.

Application filed June 6, 1918. Serial No. 238,474.

*To all whom it may concern:*

Be it known that I, JOHN W. KOHLHEPP, a citizen of the United States, and a resident of the city of Chicago, in the county of Cook and State of Illinois, have invented certain new and useful Improvements in Multiple - Drum Carcass - Dehairing Machines; and I do hereby declare that the following is a full, clear, and exact description of the same, reference being had to the accompanying drawings, and to the numerals of reference marked thereon, which form a part of this specification.

This invention pertains to an improved form of a sanitary silently operable carcass cleaning and dehairing machine wherein a carcass is elevated and conveyed from a scalding vat and deposited upon an adjustable receiving chute and is permitted to move into the field of operation of a primary rotatable flexible scraping drum mechanism which rotates and scrapes the carcass to partially clean and dehair the same, after which the supporting chute is adjusted to permit the carcass to be gradually moved upwardly by said primary scraping drum mechanism into a position to be further acted upon by said primary scraping drum mechanism and a rotatable secondary flexible scraping drum mechanism whereby the cleaning and dehairing of the carcass is completed and the carcass is discharged from the machine between said drum mechanisms by stopping the secondary drum mechanism which is flexed to permit passage of the carcass.

It is an object of this invention to provide a carcass cleaning machine wherein a carcass is adapted to be cleaned by rotatable flexible drum scraping mechanisms and discharged therebetween by stopping one of said drum mechanisms.

Another object of the invention is the construction of a carcass dehairing machine wherein a carcass is partially cleaned by a flexible scraping mechanism which is adapted to raise the carcass upwardly over itself into the field of operation of a second flexible scraping mechanism to complete the cleaning of the carcass which is then discharged from the machine between said flexible scraping mechanisms by stopping the second flexible scraping mechanism.

It is also an object of the invention to provide a machine wherein a receiving chute in normal position is adapted to retain a carcass in position to be partially cleaned by a scraper wheel, and in an adjusted position is adapted to move the carcass into a position to permit the same to be conveyed upwardly by the scraper wheel into the field of operation of a second scraper wheel which co-acts with said first scraper wheel to rotate the carcass, which by the stopping of said second scraper wheel is caused to be discharged from the machine between said scraper wheels.

A further object of the invention is the construction of a carcass cleaning machine wherein oppositely rotatable flexible scraper wheels are adapted to clean a carcass and then discharge the carcass therebetween by stopping one of said wheels.

Another object of the invention is to provide a carcass cleaning machine having flexible cleaners adapted after cleaning a carcass to discharge the same from the machine.

It is furthermore an object of this invention to construct a carcass cleaning machine wherein a flexible scraping mechanism co-acts with an adjustable carcass receiving chute to first partially clean a carcass and then convey the carcass into the field of action of another flexible scraping mechanism for completing the cleaning and permitting discharge of the cleaned carcass from the machine by stopping the second flexible scraping mechanism.

It is a further object of this invention to provide a machine wherein manually controlled rotatable scraping wheel mechanisms are adapted to clean, elevate, convey and discharge a carcass from the machine.

A further object of the invention is the construction of a carcass cleaning machine wherein a manually controlled adjustable chute is adapted to cause a carcass deposited thereon to be moved into the field of operation of flexible scrapers to be rotated and cleaned thereby and then discharged by one of said scrapers when the other is stopped.

An important object of the invention is the construction of a carcass cleaning and dehairing machine of simple and effective form having flexible scraping drums positioned to permit the same when rotating to clean a carcass and discharge the carcass therebetween when one of said drums is stopped.

Other and further important objects of this invention will be apparent from the disclosures in the specification and drawings.

The invention (in a preferred form) is illustrated in the drawings and hereinafter more fully described.

On the drawings:

Figure 1 is a side elevation of a carcass dehairing machine embodying the principles of this invention.

Fig. 2 is an elevational view of the opposite side of the machine.

Fig. 3 is a top plan view thereof with the cover removed.

Fig. 4 is a sectional view taken on line 4—4, of Fig. 3, showing the operation of parts in dotted lines.

Fig. 5 is a rear elevation of the machine with parts omitted.

Fig. 6 is a detail section taken on line 6—6, of Fig. 4, showing parts in elevation.

Fig. 7 is a detail section taken on line 7—7, of Fig. 4.

Fig. 8 is an end view of the adjustable carcass receiving chute in horizontal position.

Fig. 9 is an enlarged side elevation thereof.

Fig. 10 is an enlarged sectional detail view taken on line 10—10, of Fig. 6.

Fig. 11 is an enlarged fragmentary detail section taken on line 11—11, of Fig. 6.

Fig. 12 is an enlarged sectional detail view taken on line 12—12, of Fig. 7.

Fig. 13 is an enlarged fragmentary detail section taken on line 13—13, of Fig. 7.

As shown on the drawings:

A scalding vat 1, is disposed in front of the carcass dehairing machine and is provided with a lower shaft 2, journaled transversely within the vat and an upper shaft 3, rotatably mounted above the vat on suitable supports 4. Secured on the shafts 2 and 3, are sprocket wheels 5 and 6, around which is trained a conveyer 7, for delivering carcasses from the scalding vat to the cleaning and dehairing machine.

The cleaning machine comprises a framework 8, to which is secured casing sides 9, made of wood or other suitable material and having secured thereon a top 10, to the front edge of which is hingedly connected a door 11, which partly closes the open front portion of the framework casing. The casing is open at its bottom and lower front portion, and has a rear wall 12, which closes the upper rear portion of the casing. Secured to the lower end of the rear casing wall 12, is the upper edge of a splash curtain 13, which normally hangs to prevent water from splashing from the cleaning machine. Rigidly secured to the rear portion of the framework 8, below the curtain 13, is an inwardly projecting discharge shelf or platform 14, the inner end of which is slightly inclined upwardly. The outer end of the discharge shelf has the top thereof disposed in a plane with the top of a receiving table or platform 15, disposed to the rear of the cleaning machine for receiving discharged carcasses. Mounted transversely in the upper portion of the cleaning machine are sprinkling or spraying devices 16, for spraying hot water on carcasses during the cleaning and dehairing process.

Rigidly secured on each side of the framework 8, near the front end of the cleaning machine is a downwardly projecting bearing bracket 17, for rotatably supporting the ends of a transverse axle or shaft 18, having the lower end of a carcass receiving apron, chute or grate secured thereon between the casing walls 9. The chute normally is inclined outwardly and upwardly toward the scalding vat 1, with the upper end thereof disposed below the upper end of the conveyer 7, to receive carcasses therefrom. The chute comprises a rectangular base plate 19, upon which are riveted or otherwise secured the flanges 20, of a plurality of longitudinally disposed spaced parallel ribs or T-bars, the stems or plates 21, of which project upwardly at right angles to the base plate 19, and are reinforced by side webs 22, integrally connected between the flanges 20, and the stems 21, of said ribs and at right angles thereto. The stem plates 21, are rounded and of a greater depth near the upper end of the chute and gradually decrease in depth toward the lower end of the chute, where said stem plates 21, project beyond the lower edge of the base plate. Rigidly secured to the bottom of the lower margin of the chute base plate 19, are a plurality of apertured attaching brackets 23, which are keyed or otherwise secured on the rotatable chute shaft 18.

Rotatably mounted on one side of the framework 8, and near the front end thereof, is a stub shaft 24, which projects into the machine underneath the chute base plate 19, and has keyed or otherwise secured on the outer extending end thereof one end of a lever 25. The stub shaft 24, extends to about the center of the chute, and has keyed or otherwise secured to the inner end thereof one end of a lift or crank arm 26, having rotatably mounted on the other end thereof a roller 27, which engages the bottom surface of the chute base plate 19. Secured to the bottom of the base plate 19, is a screw eye 28, to which one end of a chain 29, is attached. The other end of the chain 29, is connected to the roller end of the crank arm 26, to afford a means whereby the chute may be returned to normal position after the same has been tipped or moved toward the rear end of the machine. The chain 29, also serves to limit the inward movement of the chute to prevent the same from striking against the primary flexible scraping drum mechanism hereinafter described.

Secured to the outside of each of the side walls 9, below the door 11, is a bearing bracket 30, for rotatably supporting the ends of a transverse axle or shaft 31, to which is rigidly secured a plurality of spaced parallel tines or arms 32, of different lengths adapted to be moved into position to control the downward movement of carcasses on the receiving chute, to break the fall of said carcasses to prevent the same from falling with too great a force against the primary flexible scraping drum mechanism. Keyed or otherwise secured on one end of the axle 31, on the outside of the machine is one end of a crank arm 33, to the other end of which is pivotally connected one end of a lever or handle 34, provided with a notch 35, in the lower edge thereof adapted to permit the lever to be moved to removably engage in a notch of a plate extension 36, secured on one of the front corners of the framework 8, for supporting the lever 34, which is adapted to slide through the notch in said guide or supporting plate 36.

Secured on the extending end of the upper conveyer shaft 3, is a large sprocket wheel 37, around which a driving chain 38, is trained. The chain 38, is also trained around a sprocket gear 39, which is keyed or otherwise secured on the extending end of a driving or primary scraping drum shaft 40, which is disposed transversely of the machine and is journaled in suitable bearings 41, mounted on the sides of the framework 8. Also secured on the shaft 40, to the outside of the sprocket gear 39, is a second sprocket gear 42. Secured on the projecting end of the shaft 40, beyond the sprocket gear 42, is a friction pulley 43, adapted to be connected by means of a belt to any suitable type of driving mechanism. An idler pulley 44, is rotatably mounted on the shaft 40, adjacent the driving pulley 43.

The main or primary, cleaning, scraping or massaging flexible drum mechanism of the device comprises, as clearly shown in Figs. 6, 10, and 11, a pair of flat rim wheels 45, which are keyed or otherwise secured on the shaft 40, adjacent the inner surfaces of the casing sides 9. Rigidly connecting the wheels 45, together, are a plurality of spaced angle bars 46, which are disposed parallel to the shaft 40, and have the ends of one flange thereof removably secured to the rims of the wheels 45, by bolts 47, or other suitable means, while the other flange projects radially from the wheel rims. Rigidly but removably secured to the projecting flanges of the angle bars 46, are a plurality of adjacently disposed primary flexible cleaning, massaging or scraping wheels, all of which are identical in construction and form a flexible scraping drum adapted not only to flex to conform to the bodies of carcasses, but also adapted for scraping and cleaning carcasses of different sizes. As shown in Fig. 6, alternate flexible scraping wheels are connected to alternate angle bars.

Each primary flexible scraping wheel comprises a plurality of flexible radial arms or spokes 48, made of flexible belting or other suitable flexible material and having the lower ends thereof removably secured to the radial flanges of alternate angle bars 46, by means of washers 49, and bolts 50. Rigidly but removably secured on each side of the outer end of each of the flexible arms or spokes 48, by means of bolts 51, are the radial flanges of oppositely directed angle braces 52. Secured rigidly by means of bolts 53, or other suitable means to the peripheral flanges of the angle braces 52, at the outer ends of the flexible arms 48, are flexible rim strips or sections 54, made of flexible belting or other suitable material. The strips 54, form the rims of the flexible wheels, and each strip 54, has rigidly secured on the outer surface thereof a plurality of peripherally disposed scraper blades 55, the free ends of which are curved outwardly. The blades 55, are preferably made of metal, and may be of any desired length, but if preferred said blades may be made of a flexible material other than metal.

Mounted above and to the rear of the lower or primary scraping drum mechanism is a secondary or upper flexible scraping drum mechanism which embraces a shaft 56, extending transversely through the cleaning machine and journaled in suitable bearing supports 57, secured on the framework 8. The shaft 56, is provided with a plurality of spaced diametrical passages to removably receive attaching bolts 58, therethrough for mounting a plurality of flexible secondary cleaning, massaging or scraping wheels on the shaft 56, in spaced relation adjacent one another to form an upper or secondary flexible scraping drum mechanism. Each of the secondary flexible scraping wheels comprises a pair of oppositely positioned apertured hub brackets or members 59, each of which has a rounded portion to conform to the curvature of the shaft, and radial apertured arms 60, to which the inner ends of radially directed flexible strips, arms or spokes 61, are secured by means of washers 62, and bolts 63. The hub bracket arms 60, are rounded or curved at their outer ends to permit free bending of the flexible spokes 61, which are made of flexible belting or other suitable material. Rigidly secured on opposite sides at the outer end of each of the flexible spokes 61, are the radial flanges of angle bars 64, to the peripheral flanges of which are secured flexible rim strips or sections 65, made of flexible belting or other suitable material. The flexible strips 65, form the rims of the flexible wheels, and each strip 65, has rigidly secured on the outer surface thereof a plurality of circumferentially disposed scraper blades 66, made of metal and having the free ends thereof curved outwardly and of any desired length.

Secured on the extending end of the shaft 56, in the plane of the sprocket gear 42, is a sprocket gear 67, around which a chain 68, is trained. Said sprocket chain also engages around the sprocket gear 42, to permit the shaft 56, to be rotated by the driving shaft 40. When a clutch mechanism 69, is moved by means of a handle 70, to clutch the sprocket gear 67, the operation of the secondary scraping drum is stopped. The clutch handle 70, normally rests upon a bracket arm 71, secured on the framework 8.

The operation is as follows:

A carcass, after being scalded in the scalding vat 1, is pushed onto the elevating conveyer 7, and delivered to the pivoted chute, the stem plates 21, of which receive the carcass. The machine is set in operation by slipping the power belt from the idler pulley 44, to the driving pulley 43, thereby causing rotation of the primary flexible scraping drum and the scalding vat conveyer 7, through the chain 38, and the sprocket gear 39, and sprocket wheel 37. The normal inclined position of the receiving chute permits the carcass to slide downwardly thereon into the cleaning machine and into the field of operation of the primary flexible scraping drum between said chute and drum. The entrance of a carcass into the machine after delivery by the conveyer 7, is controlled by the fall breaking mechanism which is manually operated by pulling forwardly on the lever 34, thereby swinging the arms 32, downwardly toward the chute to engage an entering carcass to break the fall thereof to prevent the carcass from striking against the primary flexible scraping drum with too much force. If desired the lever 34, may be moved into a position wherein the notch 35, thereof will engage the plate 36, to hold the arms 32, in lowered position to intercept and break the fall of large carcasses only and permit smaller carcasses to pass into massaging position. It will thus be seen that the entrance of carcasses of different sizes may be readily controlled by an operator positioned to operate the lever 34.

A carcass falling into massaging position between the lower portion of the chute and the flexible primary scraping wheels of the lower scraper drum, is rotated by the wheels which rotate, massage and scrape the carcasses to clean and dehair the same by the continuous operation of the lower cleaning drum, the flexible wheels of which flex to conform to the shape of the carcass to clean all parts thereof. The spraying device 16, is for sprinkling hot water upon the carcass as it is being scraped and massaged. The flexible rims 54, as well as the flexible spokes 48, of the primary scraper wheels when flexed are of course thrown outwardly again into normal position by centrifugal action.

When a carcass on the chute has been partially cleaned by the primary scraping drum, the operator lifts the lever 25, into the raised dotted line position shown in Fig. 4, thereby simultaneously moving the crank arm 26, the roller 27, of which rolls on the bottom of the chute to swing the chute inwardly toward the primary scraping drum, as shown in dotted lines, to reduce the space between said chute and drum. The movement of the chute toward the primary scraping drum is limited by the chain 29, which also acts to pull the chute back into normal position when the lever 25, is pulled forwardly toward the scalding vat. The revolving action of the primary scraping drum gradually forces the partially cleaned carcass upwardly in the machine against the chute, and when sufficiently elevated the primary drum causes the carcass to be carried by centrifugal force upwardly thereover into the field of operation of both the primary scraping drum and the secondary scraping drum which is rotated by means of the chain 68. The rotation of both drums causes rotation of the carcass which is thoroughly scraped and also washed by hot water from the spraying device. When the carcass has been sufficiently cleaned the clutch 69, is thrown in thereby causing the flexible secondary scraping drum to stop, whereby the carcass is forced by the action of the rotating primary scraping drum, downwardly between the drums causing the secondary drum to flex sufficiently to allow the carcass to roll upon the shelf 14, and be discharged from the machine onto the table 15, from which it is removed by any suitable means. The curtain 13, moves outwardly to permit the discharge of the carcass, and falls back into place again to prevent water from the action of the drums from being thrown out of the rear open portion of the machine.

It will thus be seen that when a carcass between the chute and the primary scraping drum is partially cleaned and the chute is tipped toward the primary drum that the carcass will be conveyed upwardly by the primary drum into the field of operation of both the primary and secondary drums. By then returning the chute to normal position another carcass may be lowered into the initial cleaning position to be acted upon by the primary drum at the same time that the first carcass is being acted upon by both of the cleaning drums. It will also be noted that by stopping the secondary drum to cause discharge of the upper carcass that the cleaning operation of the second carcass is not interfered with. The machine is therefore capable of cleaning a plurality of carcasses at the same time and of discharging completely cleaned carcasses without interfering with the cleaning of partially cleaned carcasses. As soon as a cleaned carcass has been discharged from the machine by stopping the secondary or upper scraping drum, said drum is set into operation again by throwing out the clutch mechanism thereby causing the flexed portions of the secondary drum to be thrown outwardly into normal position by centrifugal action, to act upon the next carcass elevated by the primary drum.

I am aware that various details of construction may be varied through a wide range without departing from the principles of this invention, and I therefore do not purpose limiting the patent granted otherwise than necessitated by the prior art.

I claim as my invention:

1. A carcass cleaning machine embracing mechanisms for first cleaning a carcass and then discharging the same from the machine downwardly between said mechanisms by stopping one of said mechanisms.

2. In a carcass cleaning machine the combination with rotatable carcass and supporting cleaning wheels, of means for stopping one of said wheels to cause discharge of a carcass by the other of said wheels.

3. In a carcass cleaning machine the combination with rotatable flexible carcass cleaning wheels, of means for stopping one of said wheels to cause discharge of the carcass between said wheels.

4. In a sanitary carcass cleaning machine of the class described a plurality of scraping mechanisms adapted to support and clean a carcass and then discharge the carcass from the machine.

5. In a silently operating carcass cleaning machine a plurality of rotatable flexible scraping drum mechanisms, means co-acting therewith to cause a carcass to be first partially cleaned by one of said mechanisms and then elevated thereby into the field of operation of all of said mechanisms to be further cleaned.

6 In a carcass cleaning machine a plurality of rotatable flexible scraping drums, adjustable means co-acting therewith to cause a carcass to be first partially cleaned by one of said drums and then elevated thereby into the field of operation of all of said drums to be further cleaned, and means for stopping one of said drums to cause discharge of said carcass from the machine.

7. A carcass cleaning machine comprising rotatable flexible scraping drums, carcass receiving means associated therewith to cause a carcass to be partially cleaned by one of said drums, means for adjusting said receiving means to cause said drum to move the carcass into the field of operation of all of said drums to be further cleaned, and a mechanism for stopping the operation of another of said drums to cause discharge of the carcass from the machine by said first mentioned drum.

8. A silently operating sanitary carcass cleaning machine comprising a primary and a secondary flexible rotatable scraping drum, an adjustable carcass receiving chute associated with said primary drum adapted to support a carcass to permit the carcass to be acted upon by said primary drum, means for adjusting said chute to cause the primary drum to elevate and move the carcass into the field of operation of both the primary and secondary drums to be further cleaned thereby, and means for stopping the operation of said secondary drum to cause the primary drum to discharge the carcass from the machine between said flexible drums.

9. The combination with rotatable flexible scraping wheel mechanisms adapted to support, rotate and clean a carcass, of means for stopping one of said scraping wheel mechanisms to discharge the carcass between said scraping wheel mechanisms by flexing said stopped scraping wheel mechanism.

10. The combination with flexible rotatable scraper wheels, of pivoted means co-acting therewith to cause the same to clean and elevate a carcass and then discharge the carcass between said scraper wheels.

11 In a carcass cleaning machine, a pair of spaced flexible massaging mechanisms, means for rotating the same to cause a carcass to be rotated and scraped by said mechanisms, and means for holding one of said mechanisms stationary whereby the other mechanism acts to discharge the carcass between said mechanisms by flexing the stationary mechanism.

12. In a carcass cleaning machine the combination with a primary flexible scraper, of a secondary flexible scraper, and a receiving chute adapted to be moved toward said primary flexible scraper to permit a carcass to be first partially cleaned by said primary flexible scraper and then elevated thereby into the field of operation between said scrapers to complete the cleaning of the carcass.

13. A carcass cleaning machine embracing a primary flexible scraping drum, a secondary flexible scraping drum disposed parallel thereto and spaced therefrom, a pivotally mounted carcass receiving chute, means for delivering a carcass on said chute and rotating said primary and secondary drums to permit said primary drum to rotate and partially clean said carcass, mechanism for adjusting said chute whereby said primary drum conveys the partially cleaned carcass into a field of operation to be simultaneously acted on by both of said drums to complete the cleaning of the carcass, and clutch means for holding said secondary drum stationary whereby the cleaned carcass is discharged between said drums by said primary drum which forces the cleaned carcass against the secondary drum to flex the same to permit passage of the cleaned carcass from the machine.

14. A carcass cleaning machine comprising rotatable scraping members adapted when rotating to rotate and clean a carcass, and means for stopping one of said members and permitting the other to rotate to cause discharge of the carcass from the machine between said members.

15. The combination with rotatable scraper wheels, of means adapted to be swung toward said wheels to cause elevation of a carcass into a position to be supported and cleaned by said wheels.

16. The combination of a pair of rotatable scraper mechanisms disposed one above the other adapted to support and clean a carcass.

17. The combination with a pair of rotatable scraper mechanisms, adapted to support a carcass while cleaning the same, and means for controlling the operation of said mechanisms to cause discharge of the carcass therebetween when cleaned.

18. The combination of a plurality of scraper mechanisms adapted to support a carcass while cleaning the same, and then discharge the carcass downwardly therebetween.

19. The combination with flexible carcass supporting and cleaning members, of means effecting the operation of one of said members to cause discharge of a cleaned carcass between said members.

20. The combination with flexible carcass supporting members rotatable in the same direction, of means effecting the operation of one of said members to cause the other member to discharge the carcass.

21. The combination of rotatable scraper members adapted to support, rotate, clean and then discharge a carcass therebetween.

22. The combination with a plurality of rotatable flexible scraping members adapted to support and clean a carcass, and means adapted to cause flexing of one of said members whereby the cleaned carcass is discharged downwardly between said members 23. The combination with a carcass cleaning machine, of a diametrically passaged rotatable shaft, a cleaning wheel, and a bolt for holding the same engaged on said shaft.

24. The combination with a carcass cleaning machine, of a diametrically passaged rotatable shaft, apertured hub brackets disposed on opposite sides of said shaft, a bolt projecting through said brackets and through said shaft, and a carcass cleaning wheel secured to said brackets.

25. The combination with a passaged rotatable shaft, of a carcass cleaning hub comprising a pair of apertured separated hub brackets disposed on opposite sides of said shaft, a bolt engaging said hub brackets and shaft for holding the hub brackets secured in place, a rim, scraper blades thereon, and spokes connecting said rim to said hub brackets.

26. A carcass cleaning wheel comprising a pair of hub brackets, arms integral therewith, a flexible rim, scrapers thereon, and flexible spokes connected to said rim and to said hub arms.

27. The combination with a passaged shaft, of a carcass cleaning wheel comprising a pair of curved apertured hub brackets positioned on opposite sides of said shaft, a bolt for holding said hub brackets secured to said shaft, arms integrally formed on the ends of said hub brackets at right angles to each other, a flexible wheel rim, scraper blades thereon, and flexible spokes connecting said rim to the arms of said hub brackets.

In testimony whereof I have hereunto subscribed my name in the presence of two subscribing witnesses.

JOHN W. KOHLHEPP.

Witnesses:
 FRED E. PAESLER,
 FRANK A. BREMER, Jr.